(12) United States Patent
Moshfeghi

(10) Patent No.: US 8,817,678 B2
(45) Date of Patent: Aug. 26, 2014

(54) METHOD AND SYSTEM FOR CENTRALIZED OR DISTRIBUTED RESOURCE MANAGEMENT IN A DISTRIBUTED TRANSCEIVER NETWORK

(75) Inventor: Mehran Moshfeghi, Rancho Palos Verdes, CA (US)

(73) Assignee: Golba LLC, Rancho Palos Verdes, CA (US)

( * ) Notice: Subject to any disclaimer, the term of this patent is extended or adjusted under 35 U.S.C. 154(b) by 16 days.

(21) Appl. No.: 13/473,105

(22) Filed: May 16, 2012

(65) Prior Publication Data

US 2013/0094440 A1    Apr. 18, 2013

Related U.S. Application Data

(60) Provisional application No. 61/548,201, filed on Oct. 17, 2011.

(51) Int. Cl.
*H04B 7/00* (2006.01)
*H04B 7/06* (2006.01)
*H04W 88/06* (2009.01)

(52) U.S. Cl.
CPC ............... *H04W 88/06* (2013.01); *Y02B 60/50* (2013.01); *H04B 7/0689* (2013.01)
USPC ........................................................ 370/310

(58) Field of Classification Search
CPC ..... H04W 28/16; H04W 28/18; H04W 28/20; H04W 28/22; H04W 52/02; H04W 72/0406; H04W 88/04; H04W 92/16
USPC .................................. 370/310, 315, 328, 329
See application file for complete search history.

(56) References Cited

U.S. PATENT DOCUMENTS 5,936,577 A    8/1999    Shoki et al.
6,718,159 B1   4/2004    Sato
6,802,035 B2   10/2004   Catreux et al.
7,248,217 B2   7/2007    Mani et al.
(Continued)

FOREIGN PATENT DOCUMENTS

WO    WO 2013/058998    4/2013
WO    WO 2013/058999    4/2013

OTHER PUBLICATIONS

Portions of prosecution history of U.S. Appl. No. 13/473,083, Mar. 3, 2014, Moshfeghi, Mehran.

(Continued)

*Primary Examiner* — Dmitry H Levitan
(74) *Attorney, Agent, or Firm* — Adeli LLP

(57) ABSTRACT

A master application device comprises a plurality of distributed transceivers, a central baseband processor, and a network management engine that manages operation of the master application device and end-user application devices. The master application device communicates data streams to the end-user devices utilizing one or more distributed transceivers selected from the plurality of distributed transceivers. The selected distributed transceivers and the end-user devices are concurrently configured by the network management engine based on corresponding link quality and propagation environment. The network management engine allocates resources to the selected distributed transceivers and the end-user devices during the data communication. The network management engine continuously monitors communication environment information to configure beamforming settings and/or antenna arrangement for the selected distributed transceivers. Beam patterns are selected for the selected distributed transceivers so as to minimize power consumption and/or based on the location and orientation information of the end-user application devices.

30 Claims, 10 Drawing Sheets

(56) References Cited

U.S. PATENT DOCUMENTS

| | | | |
|---|---|---|---|
| 7,260,141 B2 | 8/2007 | Bierly et al. | |
| 7,574,236 B1 | 8/2009 | Mansour | |
| 7,688,909 B2 | 3/2010 | Tsutsui | |
| 7,689,216 B2 | 3/2010 | Wandel | |
| 7,710,319 B2 * | 5/2010 | Nassiri-Toussi et al. | 342/377 |
| 7,890,114 B2 | 2/2011 | Braun et al. | |
| 7,904,117 B2 * | 3/2011 | Doan et al. | 455/562.1 |
| 8,098,752 B2 | 1/2012 | Hwang et al. | |
| 8,126,408 B2 | 2/2012 | Ahrony et al. | |
| 8,140,122 B2 | 3/2012 | Park et al. | |
| 8,160,601 B2 | 4/2012 | Veselinovic et al. | |
| 8,203,978 B2 | 6/2012 | Walton et al. | |
| 8,279,132 B2 * | 10/2012 | Jung et al. | 343/853 |
| 8,280,445 B2 * | 10/2012 | Yong et al. | 455/562.1 |
| 8,320,304 B2 * | 11/2012 | Deb et al. | 370/328 |
| 8,364,188 B2 * | 1/2013 | Srinivasan et al. | 455/510 |
| 8,369,791 B2 * | 2/2013 | Hafeez | 455/67.11 |
| 8,396,157 B2 | 3/2013 | Li et al. | |
| 2003/0125040 A1 | 7/2003 | Walton et al. | |
| 2004/0077354 A1 | 4/2004 | Jason et al. | |
| 2004/0082356 A1 | 4/2004 | Walton et al. | |
| 2004/0095907 A1 | 5/2004 | Agee et al. | |
| 2005/0232216 A1 | 10/2005 | Webster et al. | |
| 2007/0093270 A1 | 4/2007 | Lagnado | |
| 2007/0116012 A1 | 5/2007 | Chang et al. | |
| 2008/0166975 A1 | 7/2008 | Kim et al. | |
| 2008/0212582 A1 | 9/2008 | Zwart et al. | |
| 2008/0261509 A1 | 10/2008 | Sen | |
| 2008/0305820 A1 | 12/2008 | Sadiq et al. | |
| 2009/0093265 A1 * | 4/2009 | Kimura et al. | 455/500 |
| 2009/0156227 A1 | 6/2009 | Frerking et al. | |
| 2010/0090898 A1 | 4/2010 | Gallagher et al. | |
| 2010/0136922 A1 | 6/2010 | Rofougaran | |
| 2010/0304770 A1 | 12/2010 | Wietfeldt et al. | |
| 2011/0002410 A1 | 1/2011 | Forenza et al. | |
| 2011/0003610 A1 | 1/2011 | Key et al. | |
| 2011/0105167 A1 * | 5/2011 | Pan et al. | 455/507 |
| 2012/0083207 A1 | 4/2012 | Rofougaran et al. | |
| 2012/0083225 A1 | 4/2012 | Rofougaran et al. | |
| 2012/0083233 A1 | 4/2012 | Rofougaran et al. | |
| 2012/0083306 A1 | 4/2012 | Rofougaran et al. | |
| 2012/0129543 A1 | 5/2012 | Patel et al. | |
| 2012/0149300 A1 | 6/2012 | Forster | |
| 2012/0184203 A1 | 7/2012 | Tulino et al. | |
| 2012/0238202 A1 | 9/2012 | Kim et al. | |
| 2013/0040558 A1 | 2/2013 | Kazmi | |
| 2013/0094439 A1 | 4/2013 | Moshfeghi | |
| 2013/0094522 A1 | 4/2013 | Moshfeghi | |
| 2013/0094544 A1 | 4/2013 | Moshfeghi | |
| 2013/0095747 A1 | 4/2013 | Moshfeghi | |
| 2013/0095770 A1 | 4/2013 | Moshfeghi | |
| 2013/0095874 A1 | 4/2013 | Moshfeghi | |
| 2014/0044041 A1 | 2/2014 | Moshfeghi | |
| 2014/0044042 A1 | 2/2014 | Moshfeghi | |
| 2014/0044043 A1 | 2/2014 | Moshfeghi | |
| 2014/0045478 A1 | 2/2014 | Moshfeghi | |
| 2014/0045541 A1 | 2/2014 | Moshfeghi | |

OTHER PUBLICATIONS

Portions of prosecution history of U.S. Appl. No. 13/473,096, Apr. 28, 2014, Moshfeghi, Mehran.

Portions of prosecution history of U.S. Appl. No. 13/473,160, Jan. 15, 2014, Moshfeghi, Mehran.

Portions of prosecution history of U.S. Appl. No. 13/473,144, Feb. 6, 2014, Moshfeghi, Mehran.

Portions of prosecution history of U.S. Appl. No. 13/473,180, May 5, 2014, Moshfeghi, Mehran.

International Search Report and Written Opinion for PCT/US2012/058839, Jan. 4, 2013 (mailing date), Golba LLC.

International Preliminary Report on Patentability for PCT/US2012/058839, May 1, 2014 (mailing date), Golba LLC.

International Search Report and Written Opinion for PCT/US2012/058842, Jan. 4, 2013 (mailing date), Golba LLC.

International Preliminary Report on Patentability for PCT/US2012/058842, May 1, 2014 (mailing date), Golba LLC.

* cited by examiner

METHOD AND SYSTEM FOR CENTRALIZED OR DISTRIBUTED RESOURCE MANAGEMENT IN A DISTRIBUTED TRANSCEIVER NETWORK

CROSS-REFERENCE TO RELATED APPLICATIONS/INCORPORATION BY REFERENCE

This patent application makes reference to, claims priority to and claims benefit from U.S. Provisional Patent Application Ser. No. 61/548,201 filed on Oct. 17, 2011.

This application makes reference to:
United States Application Serial No. 13/473,09, filed on May 16, 2012, now published as U.S. Patent Publication 2013-0094439;
United States Application Serial No. 13/473,144, filed on May 16, 2012, now published as U.S. Patent Publication 2013-0095747;
United States Application Serial No. 13/473,160, filed on May 16, 2012, now published as U.S. Patent Publication 2013-0095874;
United States Application Serial No. 13/473,180, filed on May 16, 2012, now published as U.S. Patent Publication 2013-0094522;
United States Application Serial No. 13/473,113, filed on May 16, 2012, now published as U.S. Patent Publication 2013-0094544; and
United States Application Serial No. 13/473,083, filed on May 16, 2012, now published as U.S. Patent Publication 2013-0095770.

Each of the above stated applications is hereby incorporated herein by reference in its entirety.

FIELD OF THE INVENTION

Certain embodiments of the invention relate to signal processing for communication systems. More specifically, certain embodiments of the invention relate to a method and system for centralized or distributed resource management in a distributed transceiver network.

BACKGROUND OF THE INVENTION

Millimeter Wave (mmWave) devices are being utilized for high throughput wireless communications at very high carrier frequencies. There are several standards bodies such as, for example, 60 GHz wireless standard, WirelessHD, WiGig, and WiFi IEEE 802.11ad that utilize high frequencies such as the 60 GHz frequency spectrum for high throughput wireless communications. In the US, the 60 GHz spectrum band may be used for unlicensed short range data links such as data links within a range of 1.7 km, with data throughputs up to 6 Gbits/s. These higher frequencies may provide smaller wavelengths and enable the use of small high gain antennas. However, these higher frequencies may experience high propagation loss.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for centralized or distributed resource management in a distributed transceiver network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for centralized or distributed resource management in a distributed transceiver network. In accordance with various exemplary embodiments of the invention, a single network management engine is utilized to manage operation of a master application device and a plurality of end-user application devices that are served or managed by the master application device in a communication network. In some embodiments of the invention, the "master" device may be just a logical assignment and all devices in the network may have similar computational and communications capabilities. In such embodiments, a peer-to-peer network may be established with no access point involved. The master application device comprises a plurality of distributed transceivers, a central baseband processor, and the network management engine. An end-user application device served by the master application device does not comprise the network management engine and has no access to manage the network management engine. The master application device may communicate data streams utilizing one or more distributed transceivers selected from the plurality of the distributed transceivers to one or more end-user devices. The network management engine may concurrently configure the selected one or more distributed transceivers and the one or more end-user devices based on corresponding link quality and propagation environment. The network management engine may allocate and manage resources in the communication network and perform transmit power control, frequency hopping and/or beam pattern hopping to reduce outside electrical or RF interference during the data communication. The central baseband processor may perform digital signal processing needed for transmit and receive operations for each of the selected one or more distributed transceivers. The network management engine may continuously monitor communication environment information such as, for example, propagation environment conditions, link quality, device capabilities, usage of resources, available resources, device locations, target throughput, and/or application quality of service (QoS) requirements. Beamforming settings, transmit power levels per transceiver for different devices and/or antenna arrangement may be configured for the selected one or more distributed transceivers based on the communication environment information. The network management engine may select beam patterns so as to minimize power consumption, and/or based on device location and orientation information.

Figure 1:
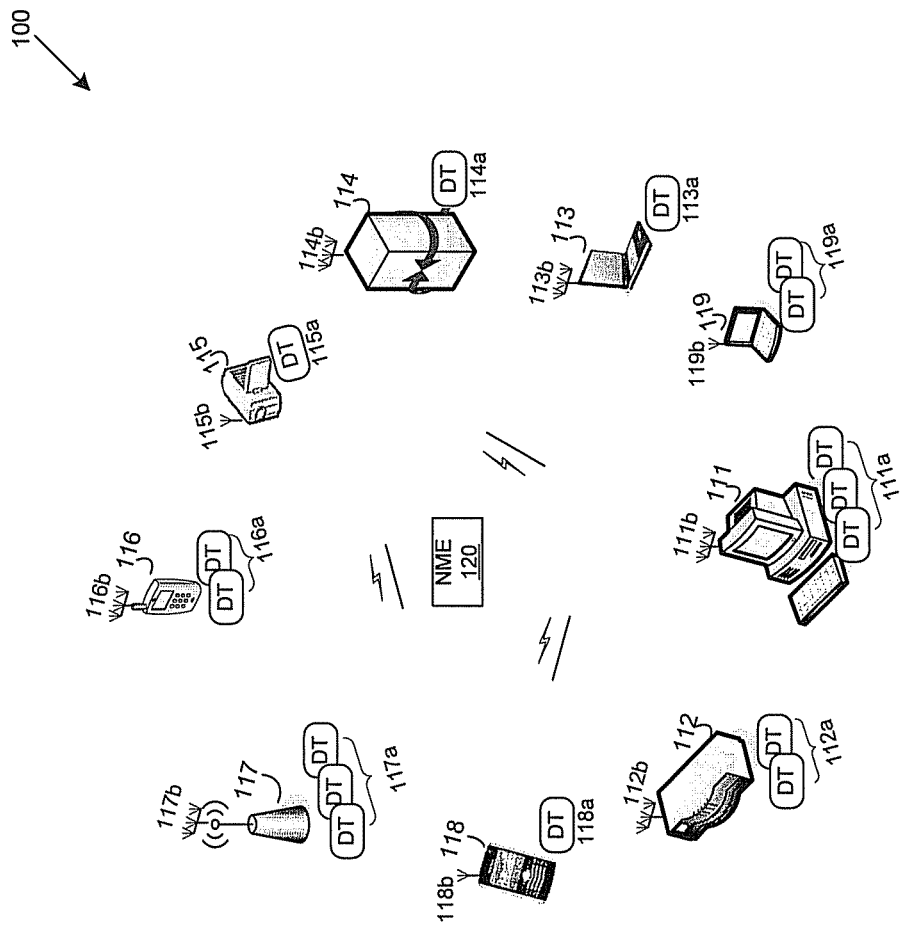
FIG. 1 is a block diagram illustrating an exemplary communication system that supports resource management in a centralized managed distributed transceiver network, in accordance with an embodiment of the invention.

FIG. 1 is a block diagram illustrating an exemplary communication system that supports resource management in a centralized managed distributed transceiver network, in accordance with an embodiment of the invention. Referring to FIG. 1, there is shown a communication network 100 comprising a plurality of application devices, of which application devices 111-119 are displayed.

The application devices 111-119 may comprise suitable logic, circuitry, code, and/or interfaces that may be operable to communicate voice and data with one to another over wired and/or wireless connections. In an exemplary embodiment of the invention, each of the application devices 111-119 in the communication network 100 may comprise one or more distributed transceivers (DTs) for communication in the communication network 100. For example, distributed transceivers 111a through 119a may be integrated in the application devices 111 through 119, respectively, and utilized for receiving and transmitting signals. Each distributed transceiver may be equipped with an independently configurable antenna or antenna array that is operable to transmit and receive signals over the air. For example, the distributed transceivers 111a each may be equipped with an independently configurable antenna array 111b, and the distributed transceiver 118a, however, may be equipped with a single independently configurable antenna 118b to transmit and receive signals over the air. Depending on device capabilities and user preferences, distributed transceivers such as the distributed transceivers 111a within the application device 111, for example, may comprise radios such as, for example, a millimeter Wave (mmWave), a WLAN, WiMax, Bluetooth, Bluetooth Low Energy (BLE), cellular radios, WiMAX radio, or other types of radios. In this regard, radios such as mmWave radios may be utilized at very high carrier frequencies for high throughput wireless communications.

In an exemplary operation, the distributed transceivers 111a through 119a in the communication network 100 are physically positioned and oriented at different locations within corresponding application devices such like laptop, TV, gateway and/or set-top box. The distributed transceivers 111a through 119a may be centrally managed by a single network management engine (NME) 120 of the communication network 100. In an exemplary embodiment of the invention, the network management engine 120 may reside within a specific application device in the communication network 100. The network management engine 120 may be centralized as a full software implementation on a separate or remote network microprocessor, for example. An application device in the communication network 100 may act or function as a master application device or an end-user application device. The application device may be an access point (e.g., WLAN 802.11abgn), a base station (e.g., cellular 3G/LTE), or a node in a peer-to-peer link (e.g., Bluetooth). An application device that comprises the network management engine 120 and/or may have access to manage or control the network management engine 120 to dynamically configure and manage operation of the entire distributed transceivers in the communication network 100 is referred to a master application device. An application device that does not comprise the network management engine 120 and/or may have no access to manage or control the network management engine 120 is referred to as an end-user application device.

In some instances, the application device 111 acts as a master application device in the communication network 100. In an exemplary embodiment of the invention, the network management engine 120 in the master application device 111 may be utilized to configure, control, and manage the entire distributed transceivers 111a through 119a in the communication network 100 to optimize network performance. The application devices 111-119 each may operate in a transmission mode or in a receiving mode. In instances where the master application device 111 is transmitting multimedia information such as, for example, images, video, voice, as well as any other form of data to one or more receiving devices such as the end-user application devices 112-116, the network management engine 120 in the master application device 111 may be enabled to monitor and collect corresponding communication environment information or characteristics from the end-user application devices 112-116. The collected communication environment information may comprise propagation environment conditions, link quality, device capabilities, antenna polarization, radiation pattern, antenna spacing, array geometry, device locations, target throughput, and/or application QoS requirements reported. The network management engine 120 may be operable to dynamically configure the distributed transceivers 111a-116a and associated antenna or antenna array 111b-116b or transmit power levels of 111b-116b of the associated antenna or antenna array 111b-116b, and to coordinate and manage the operation of the distributed transceivers 111a-116a and associated antenna or antenna array 111b-116b based on the collected communication environment information.

In an exemplary embodiment of the invention, the network management engine 120 may be operable to perform resource allocation and management for the master application device 111 and the end-user application devices 112-116 during the transmission. For example, the management engine 120 may decide which transceivers at the master application device 111 need to be activated or switched on, and at what transmit power levels. Frequency or channel assignment may be performed by the management engine 120 to each of the active distributed transceivers at the master application device 111. In this regard, the management engine 120 may configure the master application device 111 to maintain continuous connections with the plurality of end-user application devices 112-116 as needed. In another example, for each of the active distributed transceivers at the master application device 111, the management engine 120 may select beam patterns, antenna polarization, antenna spacing, and/or array geometry with least power consumption in accordance with corresponding physical locations of the activated distributed transceivers. Furthermore, the management engine 120 may enable implementation of transmit power control to save power, minimize cross-interference between various wireless links, and to optimize end-to-end network performance.

In the collected communication environment information, the link quality may comprise signal-to-noise ratios (SNR) at different transceivers, signal-to-interference-noise ratios (SINR) at different transceivers, and/or signal-to-leakage-noise ratios (SLNR) at different devices and transceivers. The application device capabilities may comprise battery capacity, battery life, number of transceivers, number of antennas per transceiver, device interface types, maximum transmit power level, power consumption in transmit/receive modes, processing protocols, service types, service classes and/or service requirements. The interface types for the application devices 111-119 may comprise access interface types such as, for example, Multimedia over Coax Alliance (MoCa), WiFi, Bluetooth, Ethernet, Femtocell, and/or cordless. The processing protocols may comprise service layer protocols, IP layer protocols and link layer protocols, as specified, for example, in the Open Systems Interconnect (OSI) model. The service layer protocols may comprise secure protocols such as Secure Sockets Layer (SSL) and control protocols such as Spanning Tree Protocol (STP). The IP layer protocols may comprise IP signaling protocols such as, for example, SIP and H.323, and IP media transport protocols such as, for example, TCP, UDP, RTP, RTC and RTCP. The link layer protocols may comprise technology-specific PHY and MAC layer protocols such as, for example, Multimedia over Coax Alliance (MoCa), WiFi, Ethernet, Femtocell, and/or cordless.

Although communication among the application devices 111-119 with one or more distributed transceivers is illustrated in FIG. 1, the invention may not be so limited. Accordingly, an application device may be operable to utilize one or more associated distributed transceivers to communicate with one or more application devices with normal transceivers without departing from the spirit and scope of various embodiments of the invention (thereby providing backward compatibility with traditional or standard transceiver implementations). In some embodiments of the invention, a subset of the application devices 111-119 may comprise or support positioning techniques to identify the device's location. Such techniques may comprise global navigation satellite system (GNSS) (e.g. GPS, GALILEO, GLONASS), assisted-GPS, WLAN based positioning, and triangulation-based techniques. The location data may be then utilized by the NME 120 according to some other embodiments of this patent application.

Figure 2A:
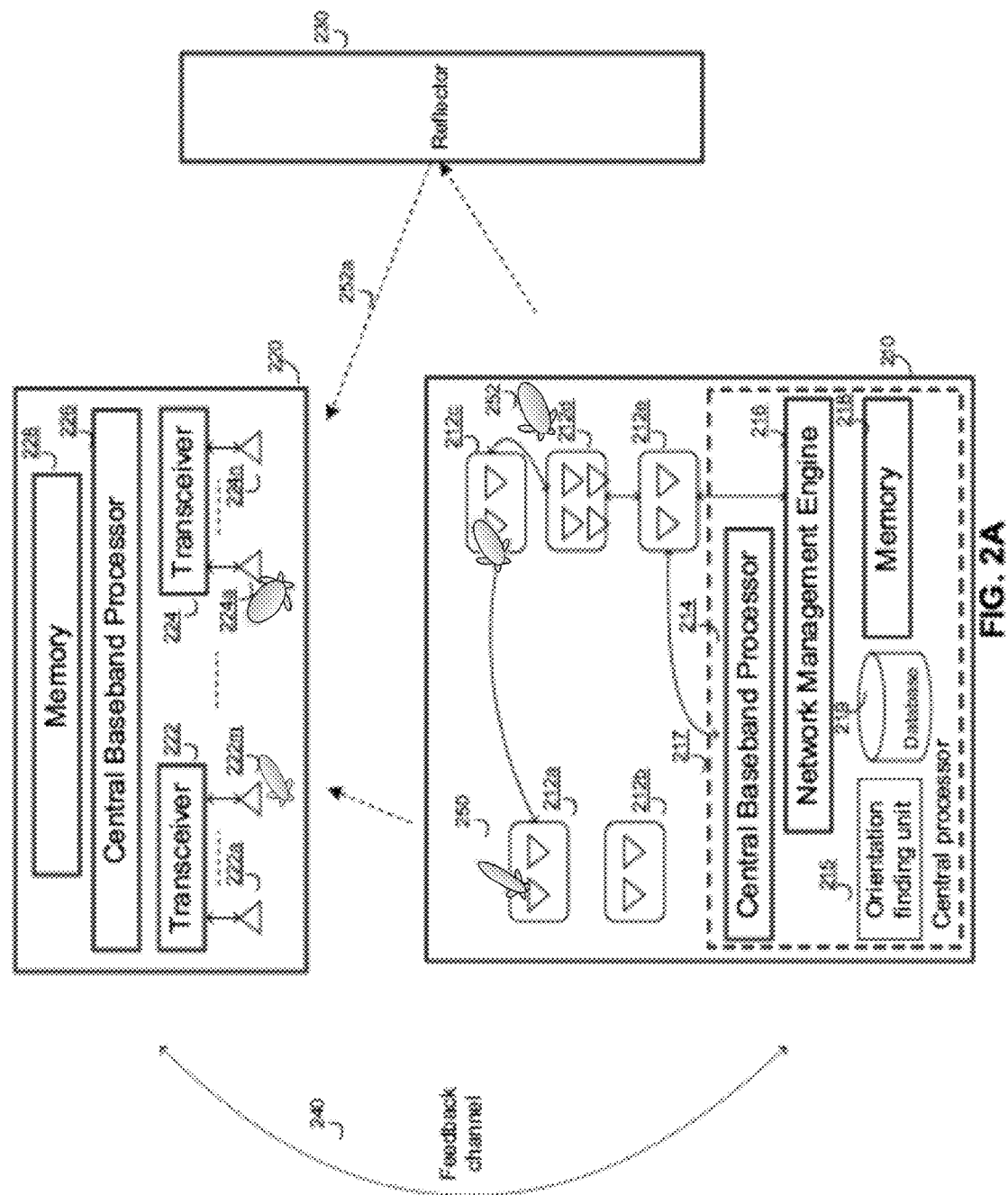
FIG. 2A is a diagram that illustrates an exemplary usage scenario where distributed transceivers are centrally managed to create a high-performance link between a transmitting device and one receiving device, in accordance with an embodiment of the invention.

FIG. 2A is a diagram that illustrates an exemplary usage scenario where distributed transceivers are centrally managed to create a high-performance link between a transmitting device and one receiving device, in accordance with an embodiment of the invention. Referring to FIG. 2A, there is shown a master application device 210 and an end-user application device 220.

The master application device 210 may comprise suitable logic, circuitry, interfaces and/or code that may be operable to communicate multimedia information such as, for example, images, video, voice, as well as any other forms of data with one or more application devices such as the end-user application device 220. The master application device 210 may comprise a collection of distributed transceivers 212a through 212e, and a central processor 217 that comprises a central baseband processor 214, a network management engine 216 and a memory 218. In an exemplary embodiment of the invention, each of the collection of distributed transceivers 212a through 212e may be physically positioned and oriented at different locations within an application device such as, for example, a laptop, TV, gateway, and set-top box. In this regard, the collection of distributed transceivers 212a through 212e may be implemented in various ways such as, for example, a single distributed transceiver integrated in a single chip package; multiple silicon dies on one single chip; and multiple distributed transceivers on a single silicon die. Depending on device capabilities and user preferences, the distributed transceivers 212a-212e may be oriented in a fixed direction or multiple different directions. In another exemplary embodiment of the invention, the collection of distributed transceivers 212a-212e may be operable to receive and/or transmit radio frequency signals from and/or to the end-user application device 220 using air interface protocols specified in UMTS, GSM, LTE, WLAN, 60 GHz/mmWave, and/or WiMAX, for example.

The central baseband processor 214 may comprise suitable logic, circuitry, interfaces and/or code that may be operable to perform baseband digital signal processing needed for transmission and receiving operation of the entire collection of distributed transceivers 212a through 212e. For example, the central baseband processor 214 may be operable to perform waveform generation, equalization, and/or packet processing associated with the operation of the collection of distributed transceivers 212a through 212e. In addition, the central baseband processor 224 may be operable to configure, manage and control orientations of the distributed transceivers 212a-212e.

The network management engine 216 may comprise suitable logic, circuitry, interfaces and/or code that may be operable to monitor and collect communication environment information such as, for example, propagation environment conditions, link quality, application device capabilities, antenna polarization, radiation pattern, antenna spacing, array geometry, transmitter/receiver locations, target throughput, and/or application QoS requirements. The network management engine 216 may utilize the collected communication environment information to configure system, network and communication environment conditions as needed. For example, the network management engine 216 may be operable to perform high level system configurations such as, for example, the number of transceivers that are activated, the number of application devices that are being communicated with, adding/dropping application devices to the communication network 100. As shown in FIG. 2A, the network management engine 216 is residing in the master application device 210. However, in some embodiments the network management engine 216 may reside on different network devices such as, for example, separate network microprocessors and servers on the communication network 100. The network management engine 216 may comprise a full software implementation, for example. In addition, the functionality of the network management engine 216 may be distributed over several devices in the communication network 100. In some embodiments the network management engine 216 may be operable to manage communication sessions over the communication network 100. In this regard, the network management engine 216 may be operable to coordinate operation of baseband processors in the communication network 100 such that various baseband processing may be split or shared among the baseband processors. For example, the network management engine 216 may enable multiple central baseband processors such as, for example, the central baseband processor 214 and the central baseband processor 226 for parallel baseband processing in order to increase throughput if needed.

The memory 218 may comprise suitable logic, circuitry, interfaces and/or code that may be operable to store information such as, for example, executable instructions and data that may be utilized by the central baseband processor 214 and/or other associated component units such as the network management engine 216. The memory 218 may comprise RAM, ROM, low latency nonvolatile memory such as, for example, flash memory and/or other suitable electronic data storage.

The end-user application device 220 may comprise suitable logic, circuitry, interfaces and/or code that may be operable to communicate multimedia information such as, for example, images, video, voice, as well as any other forms of data with one or more application devices such as the master application device 210. The end-user application device 220 may comprise transceivers 222 through 224, and a central baseband processor 226, and a memory 228. In an exemplary embodiment of the invention, each of the transceivers 222 through 224 may be a normal transceiver or a distributed transceiver. The transceivers 222 through 224 may be equipped with antenna arrays 222a-222m, and 224a-224n, respectively. Depending on device capabilities and user preferences, the transceivers 222 through 224 may be oriented in a fixed direction or multiple different directions. The transceivers 222 through 224 may be operable to receive and/or transmit radio frequency signals from and/or to the master application device 210 using air interface protocols specified in UMTS, GSM, LTE, WLAN, 60 GHz/mmWave, and/or WiMAX, for example.

The central baseband processor 226 may comprise suitable logic, circuitry, interfaces and/or code that may be operable to perform baseband digital signal processing needed for transmission and receiving operation of the entire collection of transceivers 222 through 224. For example, the central baseband processor 226 may be operable to perform waveform generation, equalization, and/or packet processing associated with the operation of the transceivers 222 through 224. In addition, the central baseband processor 226 may be instructed or signaled by the network management engine 216 to configure, manage and control orientations of the transceivers 222 through 224.

In some embodiments of the invention, a multi-dimensional transmit-power-control scheme may be implemented by the NME module 216. In this regard, the NME 216 may be operable to form an optimization problem with transmit power levels of transceivers 212a-212e as optimization parameters. The NME 216 may then search iteratively or in a single shot for a set of transmit power levels for the distributed transceivers 212a-212e that satisfy a set of corresponding requirements/criteria. In an exemplary embodiment of the invention, exemplary criteria that may be used for the above optimization may comprise maintaining reliable wireless link per transceiver, achieving a target total throughput (sum of throughputs over all active transceivers), minimizing total power transmitted over all active transceivers, minimizing total power consumption by the active transceivers, achieving a target sum "channel capacity" (sum of channel capacities corresponding to active transceivers), minimizing total/effective cross-interference at the receiving end's transceivers, and/or minimizing total undesired interference caused to other active devices in the vicinity.

Some embodiments of the invention may comprise transmit power distribution/budgeting schemes that may be applied over the transceivers within a device, the master application device 210, the end-user application device 220, or the end-user application device 250. In this regard, distribution of transmit power levels may be optimized through meeting certain performance criteria. For example, assume that the throughput achievable by the distributed transceiver 212a as a function its transmit power level is represented by $T\_212a\{TXP\_212a\}$. The total achievable throughput then becomes $T\_total=T\_212a\{TXP\_212a\}+ \ldots + T\_212e\{TXP\_212e\}$. Then the power distribution optimization problem becomes finding a set of $\{TXP\_212a, \ldots, TXP\_212e\}$ values such that T_total is above a target/desired throughput while the sum of $TXP\_212a+ \ldots +TXP\_212e$ is minimized. The relationship between throughput and transmit power level (i.e., $T\{.\}$ function) may be defined by a look-up table based on communication/system/implementation parameters, or derived from analytical throughout/channel-capacity formulas. In another example, when cross-interference between the different simultaneous links is not negligible, then the throughput functions may be modified to represent the impact of all other transceivers' transmit power levels on each transceiver's throughput. In this case, the total throughput functions may be modified as $T\_total= T\_212a\{TXP\_212a, \ldots, TXP\_212e\}+ \ldots +T\_212e\{TXP\_212a, \ldots, TXP\_212e\}$, since every link's throughput now depends on all other transmit power levels. Again, the power distribution optimization problem becomes finding a set of $\{TXP\_212a, \ldots, TXP\_212e\}$ values such that the above T_total exceeds a target/desired throughput while the sum of $TXP\_212a+ \ldots +TXP\_212e$ is minimized.

In some embodiments of the invention, the throughput function $T\{.\}$ is substituted with Shannon channel capacity function $C\{.\}$ which is again a function of transmit power level.

In some embodiments of the invention, a single device, the master application device 210 or the end-user application device 220, for example, may be configured to deploy a number of baseband processors to implement the system and data processing requirements/demands. For example, several baseband processors may be deployed within the single device to generate and/or decode different data streams that may be transmitted/received by several distributed transceivers. In this configuration, the network management engine 216 may also be operable to control and coordinate the operation of the multiple baseband processors within the single device. In this regard, several internal connection topologies may be used or implemented. In some embodiments of the invention, each baseband processor in the single device may be dedicated to a subset of distributed transceivers and either ring/star topologies may be used. In this case, there may be no data transfer between the subsets of distributed transceivers. In another embodiment of the invention, the entire baseband processors and distributed transceivers within the single device may be connected together through a ring topology (using a single cable). In this case, the baseband processors within the single device may be coordinated to share the cable utilizing time-multiplexing at the same IF frequency or frequency-multiplexing at different IF frequencies. The baseband processors within the single device may have different power/processing/communication characteristics. In some embodiments of the invention, one or more baseband processors that are most suitable for a mode of operation (e.g., lower power consumption meeting the throughput requirement) may be activated and other baseband processors may be disabled for power saving.

The memory 228 may comprise suitable logic, circuitry, interfaces and/or code that may be operable to store information such as executable instructions and data that may be utilized by the central baseband processor 226 and/or other associated component units such as weight coefficients for the antenna arrays 222a-222m, and 224a-224n. The memory 228 may comprise RAM, ROM, low latency nonvolatile memory such as, for example, flash memory and/or other suitable electronic data storage.

In an exemplary operation, a wireless link may be established between the master application device 210 and the end-user application device 220 through a reflector 230. In an exemplary embodiment of the invention, the master application device 210 may be operable to continuously scan the propagation environment to identify the directions and antenna patterns that result in strong reflected signals at the end-user application device 220. Then, the master application device 210 may associate each strong reflector with one of the collection of distributed transceivers 212a through 212e so as to transmit an independent different data stream to the end-user application device 220 over each distributed transceiver and through each strong reflector. For example, the master application device 210 transmits two data streams to the end-user application device 220 using two different distributed transceivers 212a and 212d that may use the same frequency channel. In particular, the distributed transceivers 212a may choose a beam pattern 250 and orientation for a direct line of sight (LOS) to a transceiver 222, for example, of the end-user application device 220 (the receiving device) and transmit a first data stream over a carrier frequency RF1. On the other hand, the distributed transceiver 212d may choose a different beam pattern 252 and orientation that is pointing towards the reflector 230 and transmit a second data stream also over the same carrier frequency RF1. The reflector 230 then may reflect the beam 252 towards a different transceiver 224 of the end-user application device 220. The selection of the beam patterns 250 and 252 may come from the central baseband processor 214 and the network management engine 216. In an exemplary embodiment of the invention, the central baseband processor 214 may profile channel energy for directions of arrival and other schemes. The network management engine 216 may know communication environment information such as, for example, the number of users, number of streams needed, and/or available frequency channels.

The network management engine 216 may correlate beam patterns or configurations with physical location utilizing a database 219 in the master application device 210. The database 219 may comprise suitable logic, circuitry, interfaces and/or code that may be operable to record and/or store beam patterns or configurations in terms of corresponding location and orientation information. In this regard, once the location (even a coarse/initial location) and orientation of an application device and/or the distributed transceivers within an application device are determined, an initial assignment of active transceivers and/or beam pattern or configuration for the associated antenna array 212a may be selected from the database 219. The database 219 may comprise data the represents the mapping of physical locations and/or orientations of application devices in the environment to some initial "good" network configurations such as list of transceivers to be active within each device and their corresponding antenna/beam configurations. The database 219 may continuously be updated and fine-tuned by the master application device 210 as more application devices enter the network and finer configurations may be derived by the network management engine 216. Additionally, the database 219 may be utilized to store and track the positions of dominant reflectors in the environment and how the location of those reflectors impacts the selection of optimal transceivers and antenna configurations. The NME 216 is operable to feed both the approximate locations of application device and dominant reflectors to the database 219 to derive an initial "good" network/device configuration. Various positioning techniques such as Angle-of-arrival (AOA), Time-of-Arrival (TOA) measurements may be utilized for initial coarse positioning. In an exemplary embodiment of the invention, an end-user application device such as the end-user application device 220 may be operable to utilize Bluetooth and/or wireless LAN (WLAN) and/or mmWave to identify its own coarse position. In general, the same primary wireless protocol used for data communication (or an auxiliary wireless protocol) may be used for the purpose of the above-mentioned positioning. In this regard, beaconing may be transmitted to communicate location and orientation information of the end-user application device 220 to the network management engine 216. The network management engine 216 may configure the associated distributed transceivers to different directions and beams. Antennas equipped to the distributed transceivers may not necessarily be omnidirectional. The transmitted beacons may cover the entire geographic area of interest without requiring the distributed transceivers to be equipped with omnidirectional antennas or omnidirectional antenna arrays. Beacon packets may be generally used for control/negotiation amongst the devices in the network (e.g., time/frequency allocations, network coordination/synchronization). Beacon packets therefore require a high fidelity and should be reliably communicated even without any good beamforming configurations. To achieve this, beacon packets are desired to be transmitted in an omnidirectional fashion. In some embodiments of the invention, the available distributed transceivers are utilized and configured to provide an effective omnidirectional coverage while maintaining high effective-transmit-power in every direction. This may be achieved by setting each transceiver in directional/beamforming configuration, but each pointing at a different direction (and collectively covering the full space). In some embodiments of the invention, the beaconing phase/period may be also used for initial/coarse positioning (in addition to network setup/synchronization) where this initial positioning data is fed into the database to derive "good" antenna/device configurations to be used for consequent high-throughput packets.

An orientation finding unit 215 may comprise suitable logic, circuitry, interfaces and/or code that may be operable to identify or find orientation information of the master application device 210. The orientation finding unit 215 may comprise a gyroscope and/or an accelerometer. The database 219 may be trained and improved over time so as to map fine beam patterns with location and orientation of device. In an exemplary embodiment of the invention, the network management engine 216 may utilize device location and orientation information to configure corresponding beam patters to be utilized. For example, the central baseband processor 214 and the network management engine 216 may select narrow beams for close devices and may select wide beams for further devices, respectively.

In one embodiment of the invention, the master application device 210 may be operable to utilize the reflector 230 for the second data stream, for example, to lower the chances of an object blocking both the first and second data streams, simultaneously. In other words, if a big enough object blocks the LOS between the master application device 210 and the end-user application device 220, the second data stream may likely be intact and sustained by complete direct reflecting through a reflected path 252a. Although FIG. 2A shows one reflector 230, in one embodiment of the invention, several reflectors may be used to transmit one data stream or multiple data streams. The use of multiple reflectors may provide reflection diversification in case one reflector or a sub-set of reflectors are blocked. In other words, instead of directing all transmit power towards one reflector only, the total transmit power may be distributed to propagate over a set of "good" reflectors in the environment. This distribution of power over different reflectors may be done in a controlled, configurable, adaptive, and intelligent manner. For example, reflectors may be chosen and targeted that provide better orthogonality between the different paths. In FIG. 2A, the master application device 210 may use a second reflector at a different location and another distributed transceiver 212c, for example, to communicate with the end-user application device 220 and send a third data stream. Also the reflected path 252a may be caused by more than one reflector where, for example, the distributed transceiver 212e transmits towards the reflector 230 and the reflection transmits towards a second reflector and the reflection of the second reflector reaches the end-user application device 220. In another embodiment of the invention, the first and second data streams in FIG. 2A may comprise the same data content and the use of LOS path and one or more reflector paths may provide link robustness for data content in case an obstacle blocks some of the paths.

In an exemplary embodiment of the invention, the master application device 210 may continuously monitor and collect propagation environment conditions, link quality, device capabilities, locations, target throughput, and/or application QoS requirements reported from the end-user application device 220. In this regard, a feedback channel 240 may be utilized by the end-user device 220 to report and negotiate configuration information with the master application device 210. The feedback channel 240 may comprise a low-throughput connection or link, and may be implemented through a WLAN, Bluetooth, and/or 60 GHz link, for example. The reported information from the end-user application device 220 may comprise, for example, channel measurement, device capabilities, battery life, number of transceivers, number of antennas per transceiver, antenna polarization, radiation pattern, measured cross-interference levels, antenna spacing, array geometry, the sequence of antenna array coefficients being evaluated, device locations, target throughput, and/or application QoS requirements.

The network management engine 216 may allocate and manage resources such as, for example, frequency channels, time slots, processors and/or storage to establish and maintain connections or links between the master application device 210 and the end-user application device 220 based on the reported information. For example, the management engine 120 may be operable to determine which transceivers are to be switched ON for transmission and at what transmit power levels based on device locations, power and battery storage capabilities and/or capacities, and antenna beamforming capabilities. Transmit power control, frequency hopping and/or beam pattern hopping may be utilized to reduce outside electrical or RF interference during transmission.

Figure 2B:
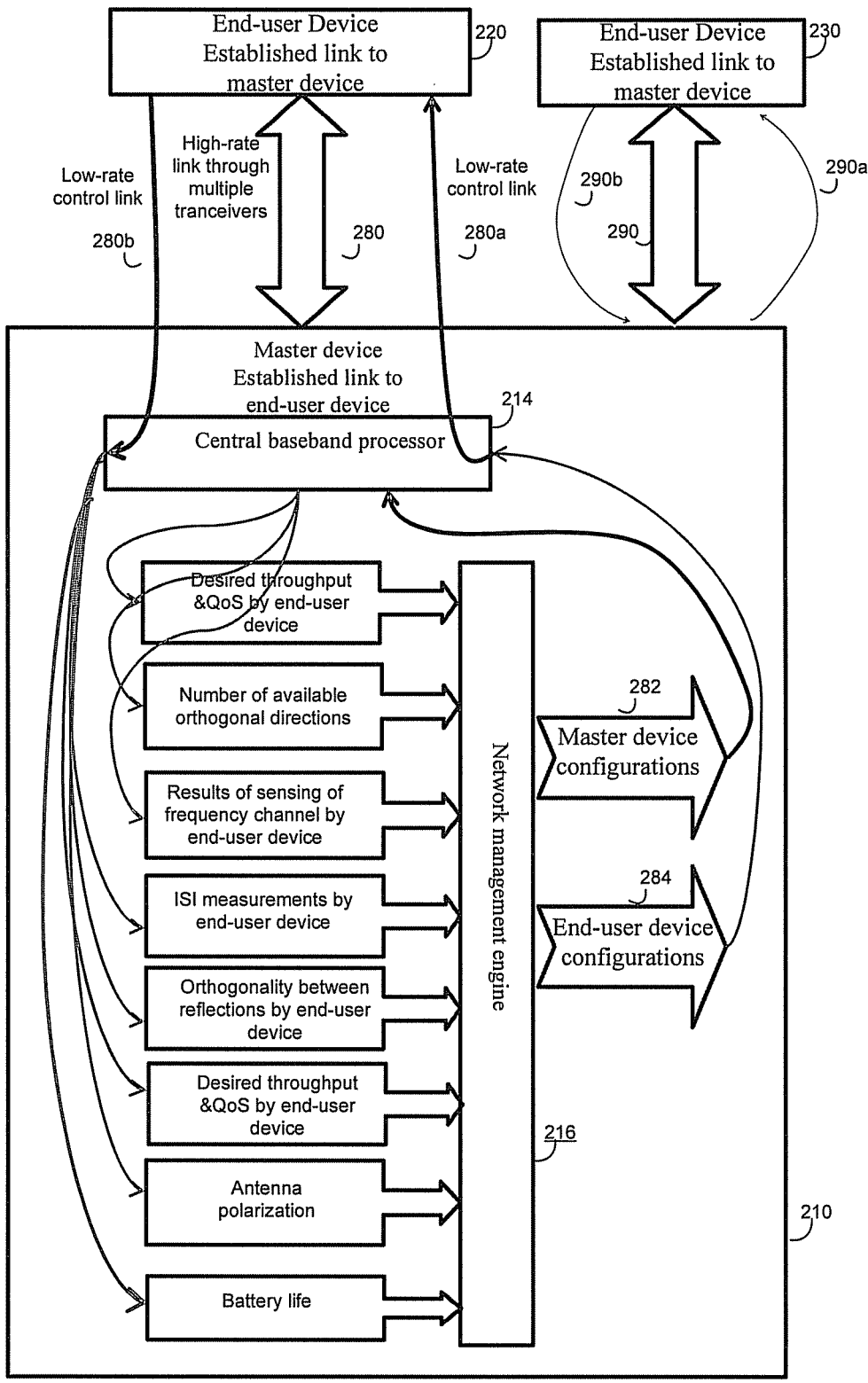
FIG. 2B is a diagram that illustrates an exemplary usage scenario where high-performance links are created between a master application device and one or more end-user application devices in a centralized managed distributed transceiver network, in accordance with an embodiment of the invention.

FIG. 2B is a diagram that illustrates an exemplary usage scenario where high-performance links are created between a master application device and one or more end-user application devices in a centralized managed distributed transceiver network, in accordance with an embodiment of the invention. Referring to FIG. 2B, there is shown the master application device 210 and the end-user application device 220.

In an exemplary operation, two control links 280b and 280a may be established between the master application device 210 and the end-user application device 220. The control link 280b is an uplink connection from the end-user device 220 to the master application device 210. The control link 280a is a downlink connection from the master application device 210 to the end-user device 220. The two control links 280b and 280a may be implemented as low-rate high-fidelity high-range links utilizing Bluetooth in the 2.4 GHz band, WLAN in the 5 GHz band, or even a low-throughput mode of 60 GHz. In some instances, the master application device 210 may attempt to establish a high-throughput link 280 with the end-user application device 220. Initially, the master application device 210 and the end-user application device 220 may utilize the downlink control link 280a and the uplink control link 280b, respectively, to negotiate corresponding configurations to be used for the high-throughput link 280. The network management engine 216 may be operable to collect information from both the master application device 210 and the end-user application device 220. In an exemplary embodiment of the invention, the NME 216 may be operable to collect information from all other devices in the vicinity even if no high-throughput links are established yet. The collected information may comprise, for example, a number of transceivers, a number of antennas per transceiver, antenna polarization, radiation pattern, antenna spacing, array geometry, the sequence of antenna array coefficients being evaluated or to be evaluated in the next time slots, device locations, target throughput, and/or application QoS requirements. Furthermore, the network management engine 216 may track the usage and availability of resources such as frequency bands and bandwidth requests by other devices in the vicinity. The network management engine 216 may instruct or signal the master application device 210 and the end-user application device 220 to start with an initial mode of operation such as the spatial diversity mode. For example, in instances where the requested throughput targets are high and the network management engine 216 identifies several available frequency bands, the network management engine 216 instructs the master application device 210 to use the frequency diversity mode. At this point, the master application device 210 and the end-user application device 220 may be enabled to perform channel estimation, and to analyze and identify the best direction/pattern for each transceiver based on reflections and environment conditions. Once optimal configurations are selected, the master application device 210 and the end-user application device 220 may report corresponding link quality figures back to the network management engine 216. At this maintenance phase, the master application device 210 and the end-user application device 220 may continue reporting their link quality figures, as well as target throughputs and QoS requirements, to the network management engine 216. If at any time, the network management engine 216 determines that the throughput and QoS requirements of the high-throughput link 280 between the master application device 210 and the end-user application device 220 are substantially above the requested levels, the network management engine 216 may configure the master application device 210 and the end-user application device 220 to switch to the spatial diversity mode, for example, to free up bandwidth for other potential users. This change in configuration may be already available to the master application device 210, and the end-user application device 220 may be notified about it over the downlink control link 280a. The network management engine 216 may utilize different rules or policies for configuring application devices such as, for example, the master application device 210 and the end-user application device 220 in the communication network 100.

In an exemplary embodiment of the invention, the network management engine 216 may configure the master application device 210 to maintain connections with the plurality of different end-user application devices in the communication network 100 as needed. For example, a different end-user application device 230 in the communication network 100 may also request to establish a different high-throughput link 290 with the master application device 210. In this case, two different control links 290b and 290a may be established between the master application device 210 and the end-user application device 230. The control link 290b is an uplink connection from the end-user device 230 to the master application device 210. The control link 290a is a downlink connection from the master application device 210 to the end-user device 230. The two control links 290b and 290a may be implemented as low-rate high-fidelity links utilizing Bluetooth in the 2.4 GHz band, WLAN in the 5 GHz band, or even a low-throughput mode of 60 GHz.

In some instances, the end-user application device 230 may communicate the link-request to the master application device 210 and to the network management engine 216 through a low-throughput control link 290a from the end-user device 230 to the master application device 210. Based on the throughput request of the end-user application device 230, the network management engine 216 may configure the master application device 210 to free up a few of its distributed transceivers and shift the data streams between the master application device 210 and the end-user application device 220 to be transported over the same frequency channel. The network management engine 216 may configure the idle transceivers of the master application device 210 to establish the high throughput link 290 with the end-user application device 230 on a different channel frequency. In an exemplary embodiment of the invention, the network management engine 216 may continuously monitor network requirements and conditions and may reconfigure the settings and utilizations of the entire application devices in the communication network 100. The network management engine 216 may be responsible for compiling data such as the numbers of routes and buses for a given network as well as its service population, and switching associated transceivers between different modes of operation, such as, for example, spatial diversity mode, frequency diversity mode, multiplexing mode, and MIMO mode.

Figure 3:
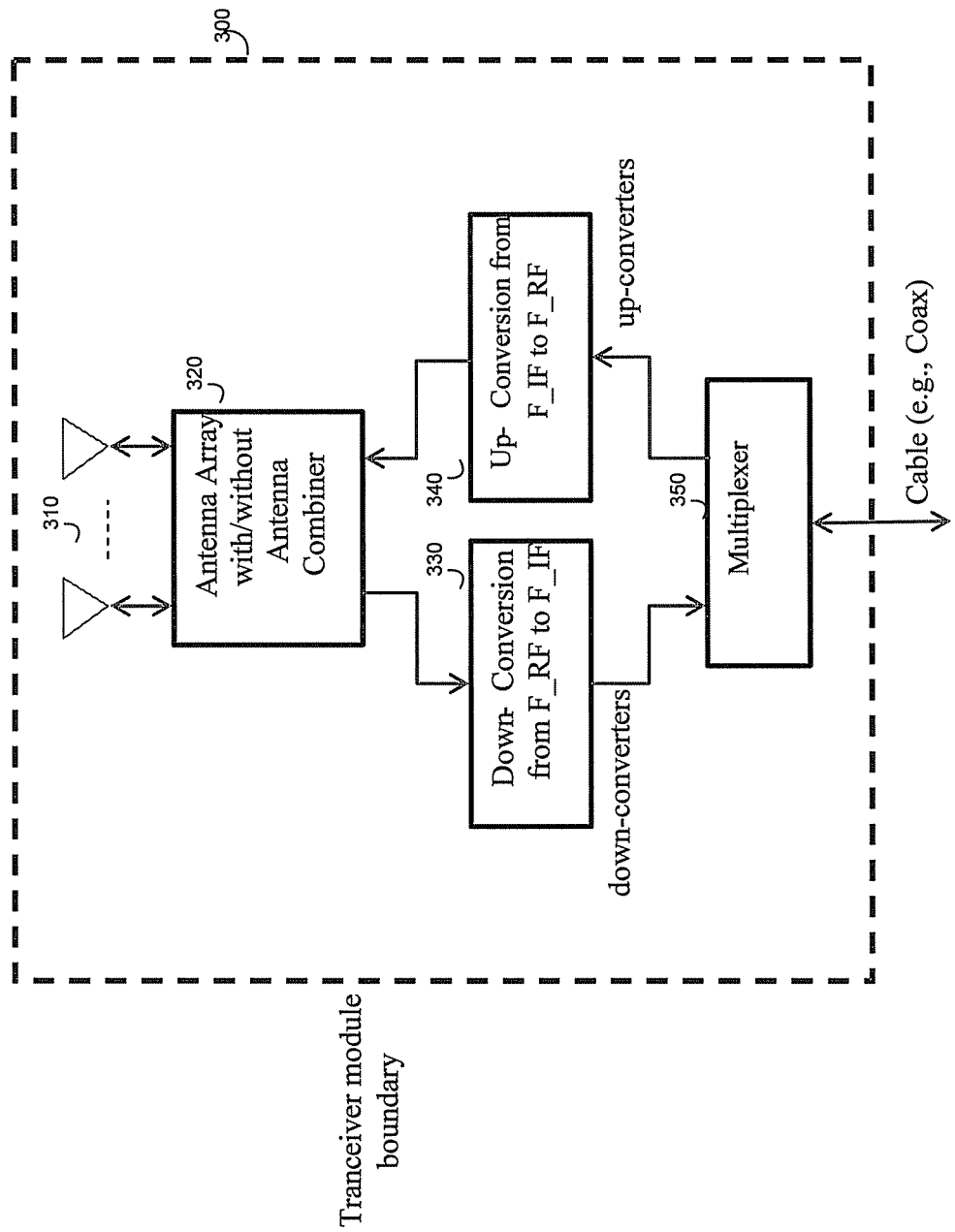
FIG. 3 is a diagram that illustrates an exemplary transceiver module, in accordance with an embodiment of the invention.

FIG. 3 is a diagram that illustrates an exemplary transceiver module, in accordance with an embodiment of the invention. Referring to FIG. 3, there is shown a transceiver 300 comprising an antenna array 310, an antenna array with/without antenna combiner 320, down-converters 330, up-converters 340, and a multiplexer 350.

In an exemplary operation, the antenna array 310 may comprise suitable logic, circuitry, interfaces and/or code that may be operable to transmit and receive radio frequency (RF) signals over the air. For transmission the transceiver 300 may be operable to receive a transmit signal from the central baseband processor 214. The transmit signal received from the central baseband processor 214 may be up-converted to RF frequency via the up-converters 340. For reception, the transceiver 300 may pass a receive signal from the antenna array 310 after down-conversion to the central baseband processor 214. The multiplexer 350 may comprise suitable logic, circuitry, interfaces and/or code that may be operable to multiplex the transmit signal received from the central baseband processor 214 and the receive signal supplied from the antenna array 310. In this regard, the multiplexer 350 may utilize either time-division-multiplexing or frequency-domain-multiplexing to communicate the transmit signal and the receive signal over the same medium such as a cable.

The antenna array with/without antenna combiner 320 may comprise suitable logic, circuitry, interfaces and/or code that may be operable to scale and/or phase-shift signals before the down-converters 330 and/or signals after the up-converters 340. For example, in transmission operation the signal provided by the up-converters 340 may be phase-shifted by the shifter by different values. The resulting phase-shifted signals may be fed to different antenna elements within the antenna array 310. In another embodiment of the invention, the antenna array 310 may be oriented in a fixed direction or multiple different directions depending on antenna types and user preferences. For example, the antenna array 310 may be implemented as a fixed directional antenna array to provide maximal directionality (with no explicit combiner). The same two modules, that is, the antenna array 310 and the antenna array with/without antenna combiner 320, may be correspondingly utilized in a reception operation for the transceiver 300. In an exemplary embodiment of the invention, the operation of the antenna array with/without antenna combiner 320 may be managed or programmed by the network management engine 216.

The down-converters 330 may comprise suitable logic, circuitry, interfaces and/or code that may be operable to translate a radio frequency (RF) received from the antenna array 310 to an intermediate-frequency (IF) signal during reception. The up-converters 340 may comprise suitable logic, circuitry, interfaces and/or code that may be operable to translate an intermediate-frequency (IF) signal of a corresponding baseband signal supplied from the central baseband processor 214, for example to a RF signal during transmission.

In an exemplary embodiment of the invention, transceiver modules such as the transceiver 300 may be operable to perform a carrier frequency conversion or translation from F_IF (intermediate frequency) to F_RF (radio frequency) and vice versa. As an example, the network management engine 216 may select F_IF in the range of a few GHz, and may select F_RF in the range of 60 GHz, respectively. In an embodiment of the invention, the input/output frequency of the transceiver 300 may be the same, that is, and in this regard, no frequency up-conversion may be performed. In this regard, the transceiver 300 may only perform signal amplification and feeding of signals into the antenna array 310.

Figure 4:
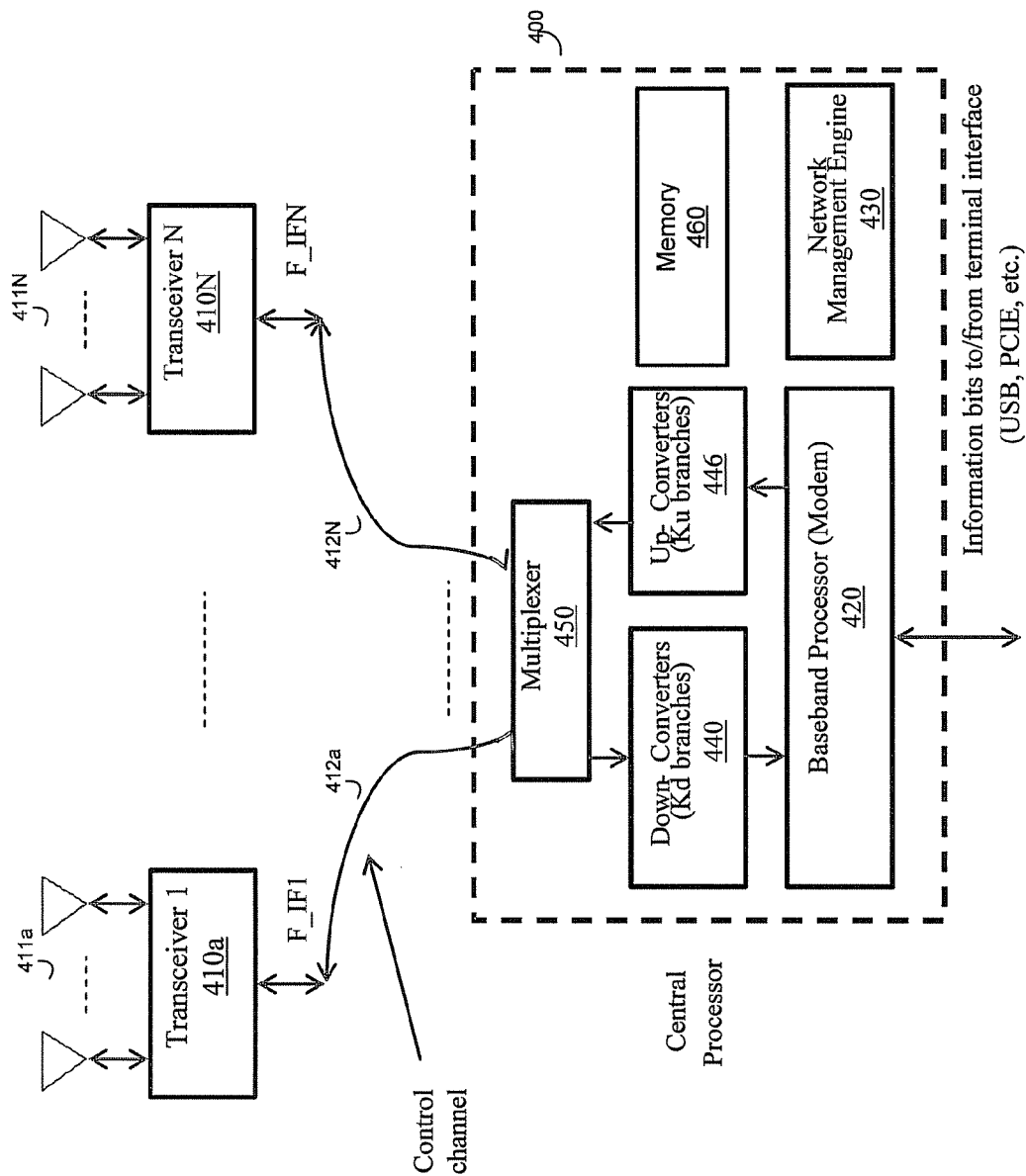
FIG. 4 is a diagram illustrating an exemplary master device with a collection of distributed transceivers that are implemented in a star topology, in accordance with an embodiment of the invention.

FIG. 4 is a diagram illustrating an exemplary master device with a collection of distributed transceivers that are implemented in a star topology, in accordance with an embodiment of the invention. Referring to FIG. 4, there is shown a central processor 400 that is connected to a collection of transceivers 410a through 410N. As shown, the collection of transceivers 410a through 410N are connected to the central processor 400 in a star topology with direct separate cables, for example, from the central processor 400 to each of the collection of transceivers 410a through 410N.

The central processor 400 comprises a baseband processor 420, a network management engine 430, down-converters 440, up-converters 446, a multiplxer 450 and a memory 460. The baseband processor 420 may comprise suitable logic, circuitry, interfaces and/or code that may be operable to provide MODEM functionality. In this regard, the central processor 400 may be operable to perform various baseband digital processing such as, for example, MIMO, OFDM, channel coding, HARQ, channel estimation and equalization, Timing/Carrier recovery and synchronization. The network management engine 430 may operate in substantially the same manner as the network management engine 218 in FIG. 2. During transmission, a baseband signal supplied from the baseband processor 420 may be translated into an intermediate-frequency (IF) signal. The up-converters 446 may further translate the IF signal to a final radio-frequency (RF) and send it over the air through an antenna array such as the antenna array 411a. For reception, the transceiver 410a, for example, may pass a received RF signal from the antenna array 411a to the down-converters 440. The down-converters 440 may translate the RF signal into an IF signal. The IF signal may further be translated to a baseband signal to the baseband processor 420, for example. The multiplxer 450 may be responsible for multiplexing receive/transmit signals utilizing either time-division-multiplexing or frequency-domain-multiplexing. The memory 460 may comprise suitable logic, circuitry, interfaces and/or code that may be operable to store information such as executable instructions and data that may be utilized by the baseband processor 420 and/or other associated component units such as the network management engine 430. The memory 360 may comprise RAM, ROM, low latency nonvolatile memory such as, for example, flash memory and/or other suitable electronic data storage.

In an exemplary embodiment of the invention, a different control channel between the baseband processor 420 and each of the distributed transceivers 410a through 410N may be utilized for configuring and managing corresponding transceivers. As shown, control channels 412a through 412N are utilized for configuring and managing the transceivers 410a through 410N, respectively. In this regard, the network management engine 430 may determine which of the transceivers are to be switched ON or activated, and at what power levels. The network management engine 430 may select beam patterns for the activated transceivers so that the least power consumption is utilized. Beam patterns of the activated transceivers may be selected by correlating beam patterns or configurations with physical locations and/or orientations of the activated transceivers. In this regard, the network management engine 430 may communicate with the database 219 to identify or determine corresponding beam patters or configurations based on corresponding physical locations and orientations of the activated transceivers. In addition, the baseband processor 420 may manage and control transmit power levels at each of the activated transceivers. In this regard, transmit power control mechanism may be applied at each of the activated transceivers to improve network performance.

In an exemplary embodiment of the invention, the distributed transceivers 410a through 410N may operate in various modes such as, for example, spatial diversity mode; frequency diversity mode, multiplexing mode and multiple-input-multiple-output (MIMO) mode. In spatial diversity mode, the central baseband processing 420 may be operable to utilize the distributed transceivers 410a through 410N to establish a spatial diversity link with intended end user device such as the end-user application device 220. For example, only a portion of the distributed transceivers 410a through 410N that may have strong propagation channel responses are activated and other transceivers are switched off for power saving. In another example, the distributed transceivers 410a through 410N may be arranged such that the master application device 210 (the transmitter) with available LOS towards the end-user device 220 (the receiver) may be configured to directly beam towards the receiver. In an exemplary embodiment of the invention, each active distributed transceiver may communicate data streams utilizing the same final carrier frequency. In frequency diversity mode, the central baseband processing 420 may manage the distributed transceivers 410a through 410N similar to spatial diversity mode except that each active distributed transceiver may utilize a different final carrier frequency if such frequency spectrum channel is available. In multiplexing mode, the central baseband processing 420 may manage the distributed transceivers 410a through 410N in such a way that different streams of data may be transmitted through different sets of the distributed transceivers 410a through 410N. For example, in multiplexing mode, different distributed transceivers of the distributed transceivers 410a through 410N may be dynamically programmed such that each transceiver's maximum pattern gain may be pointing to a different direction or reflector. As the environment changes (and hence location of reflectors and end user unit change), the antenna pattern of the distributed transceivers 410a through 410N may be re-adjusted. In MIMO mode, the central baseband processing 420 may manage the distributed transceivers 410a through 410N in such a way that different streams of data may be transmitted through different sets of the distributed transceivers 410a through 410N to a single receiver device such as the end-user application device 220. In an exemplary embodiment of the invention, the distributed transceivers 410a through 410N may be configured to switch between spatial diversity mode, frequency diversity mode, multiplexing mode and multiple-input-multiple-output (MIMO) mode based on one or more characteristics or factors, such as for example, corresponding propagation environment conditions, link quality, device capabilities, device locations, usage of resources, resource availability, target throughput, application QoS requirements, etc.

In some embodiments of the invention, the interface between the baseband processor 420 and the distributed transceivers 410a through 410N may be different than an analog IF connection. In an exemplary case, the distributed transceivers 410a through 410N may comprise analog-to-digital-converters (ADCs) and digital-to-analog-converters (DACs). In this case, a transceiver such as the distributed transceiver 410a may receive digital bits from the baseband processors 420 through a digital link and use its internal DAC to generate an analog waveform and then perform the frequency up-conversion and beamforming steps for transmission. Similarly, a transceiver such as the distributed transceiver 410a may receive an RF waveform, down-convert it, and then use its internal ADC to digitize the waveform and send the digital bits over a digital connection/cable to the baseband processor 420. In other embodiments, the distributed transceivers 410a through 410N may comprise multiple digital processing blocks or units. In this case, a portion of processing within the baseband processor 420 may be moved (in terms of partitioning) to inside the transceivers boundary. In the above embodiments of the invention, one or more digital connections or interfaces between the baseband processor 420 and the distributed transceivers 410a through 410N may be implemented or deployed. The digital connections/interfaces may comprise Ethernet and various memory bus protocols.

In some embodiments of the invention, the cable connection between the central processor 400 and the distributed transceivers 410a through 410N may be substituted with an optical connection, printed-board connection, Ethernet cable, and/or another wireless connection.

Figure 5:
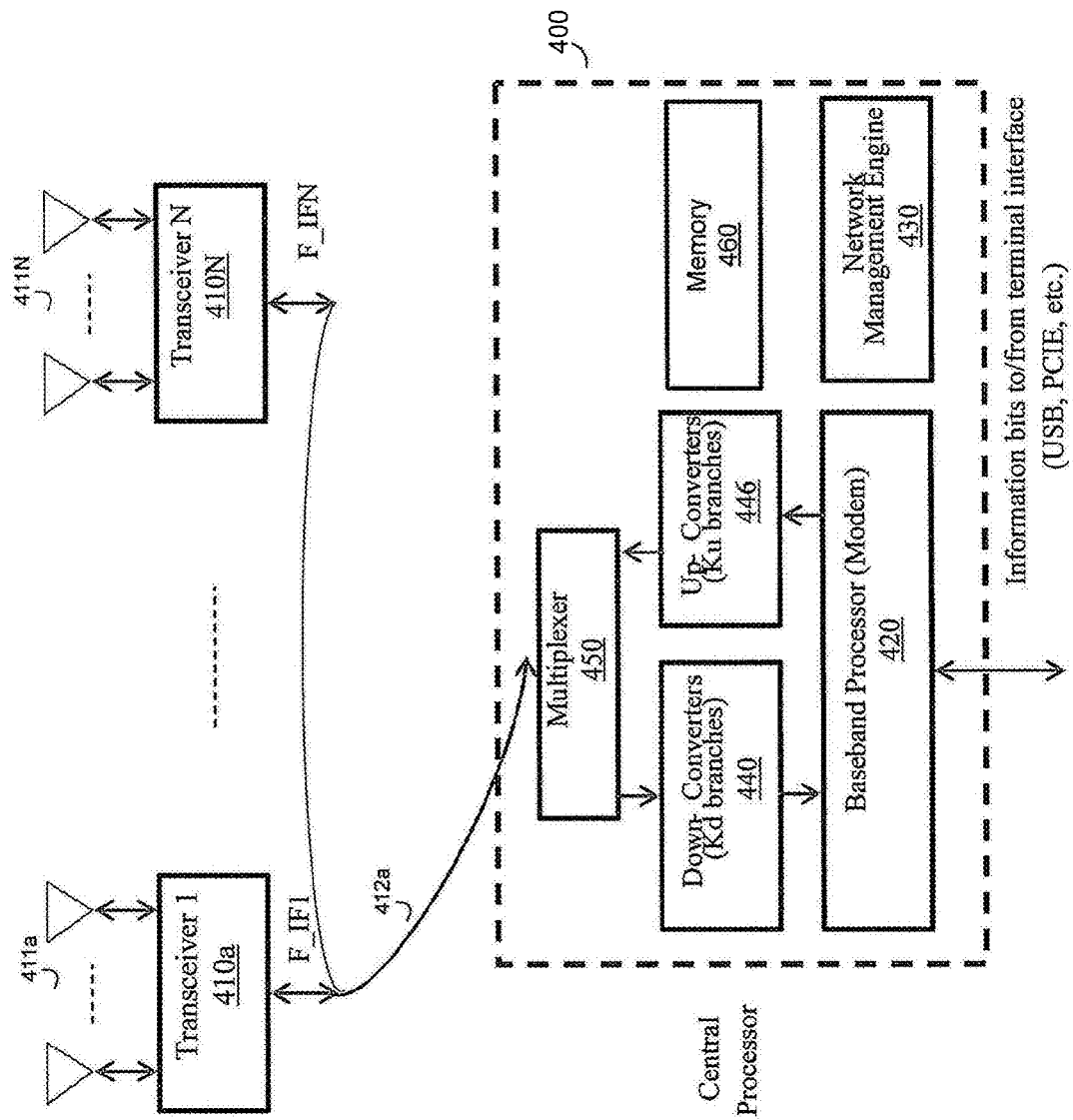
FIG. 5 is a diagram illustrating an exemplary master device with a collection of distributed transceivers that are implemented in a ring topology, in accordance with an embodiment of the invention.

FIG. 5 is a diagram illustrating an exemplary master device with a collection of distributed transceivers that are implemented in a ring topology, in accordance with an embodiment of the invention. As shown, the collection of transceivers 410a through 410N may be connected to the central processor 400 in a ring topology with a single direct cable from the central processor 400 to each of the collection of transceivers 410a through 410N. In this regard, a single control channel between the baseband processor 420 and each of the distributed transceivers 410a through 410N may be utilized for configuring the entire distributed transceivers 410a through 410N as needed.

Figure 6:
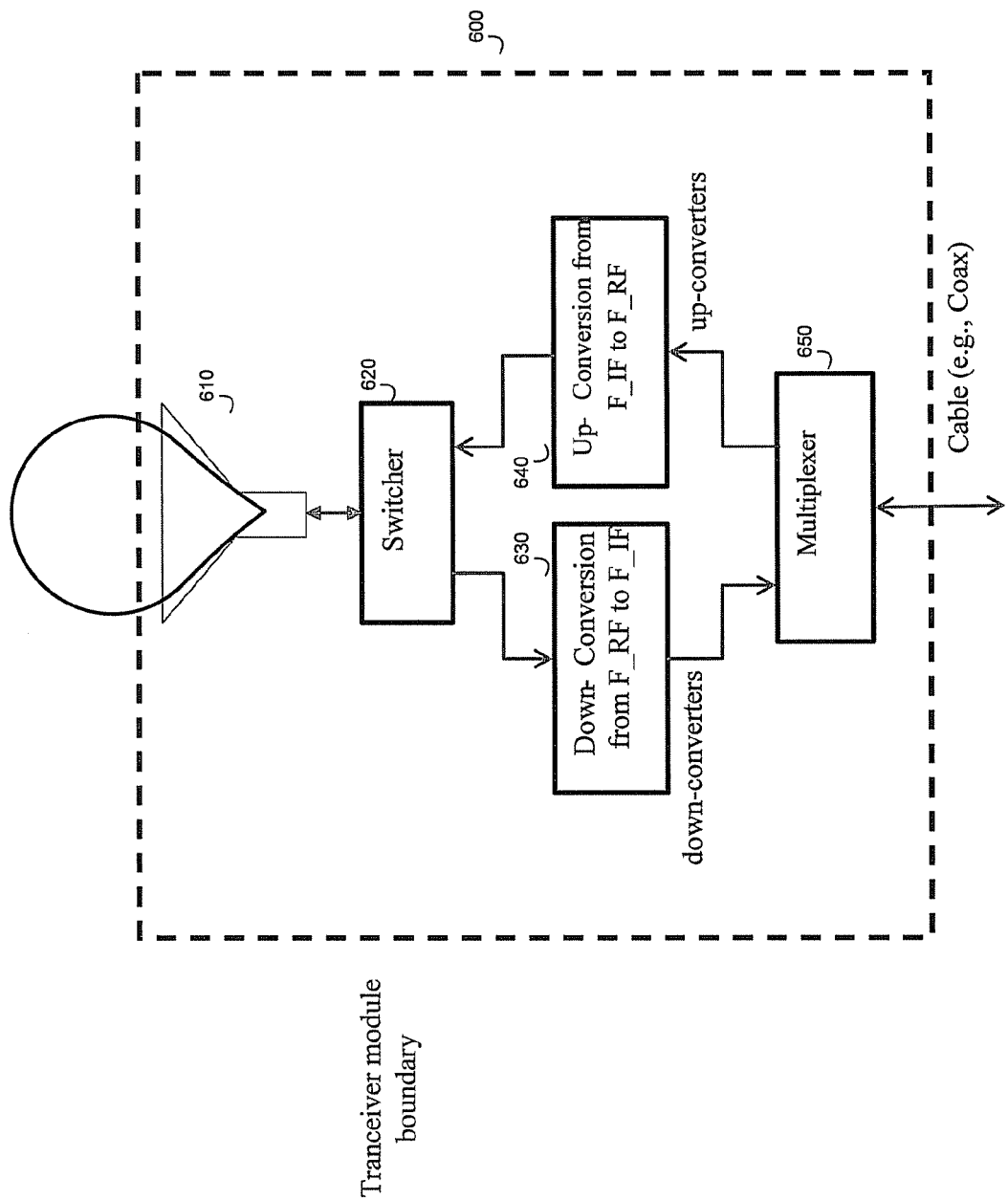
FIG. 6 is a diagram illustrating an exemplary transceiver module with a single antenna that has fixed directionality, in accordance with an embodiment of the invention.

FIG. 6 is a diagram illustrating an exemplary transceiver module with a single antenna that has fixed directionality, in accordance with an embodiment of the invention. Referring to FIG. 6, there is shown a transceiver 600. The transceiver 600 comprises an antenna 610, a switcher 620, down-converters 630, up-converters 640, and a multiplexer 650. The down-converters 630, the up-converters 640, and the multiplexer 650 may operate in substantially the same manner as the down-converters 330, the up-converters 340, and the multiplexer 350, respectively. In some embodiments, a device may utilize several such directional antennas each attached to a different transceiver and installed at a different point within the device. These antennas may be mounted to have their main lobes pointing at different directions in order to cover the space. Depending on environment/link conditions, then one or more of these transceivers/antennas may be selected by the NME 216 to provide a good link resulting in high received signal power at the other end.

In an exemplary operation, the antenna 610 may have fixed directionality. In this regard, the antenna 610 with fixed directionality may be utilized to generate a fixed beam pattern, which results in the minimized amount of power amplifiers (PAs and low noise amplifiers (LNAs) in the transceiver 600. The switcher 620 may comprise suitable logic, circuitry, interfaces and/or code that may be operable to switch on or off the transceiver 600. For example, the switcher 620 may be configured or programmed to switch on the transceiver 600 only orientated in the vicinity of the fixed directionality of the antenna 610 for power saving.

Figure 7:
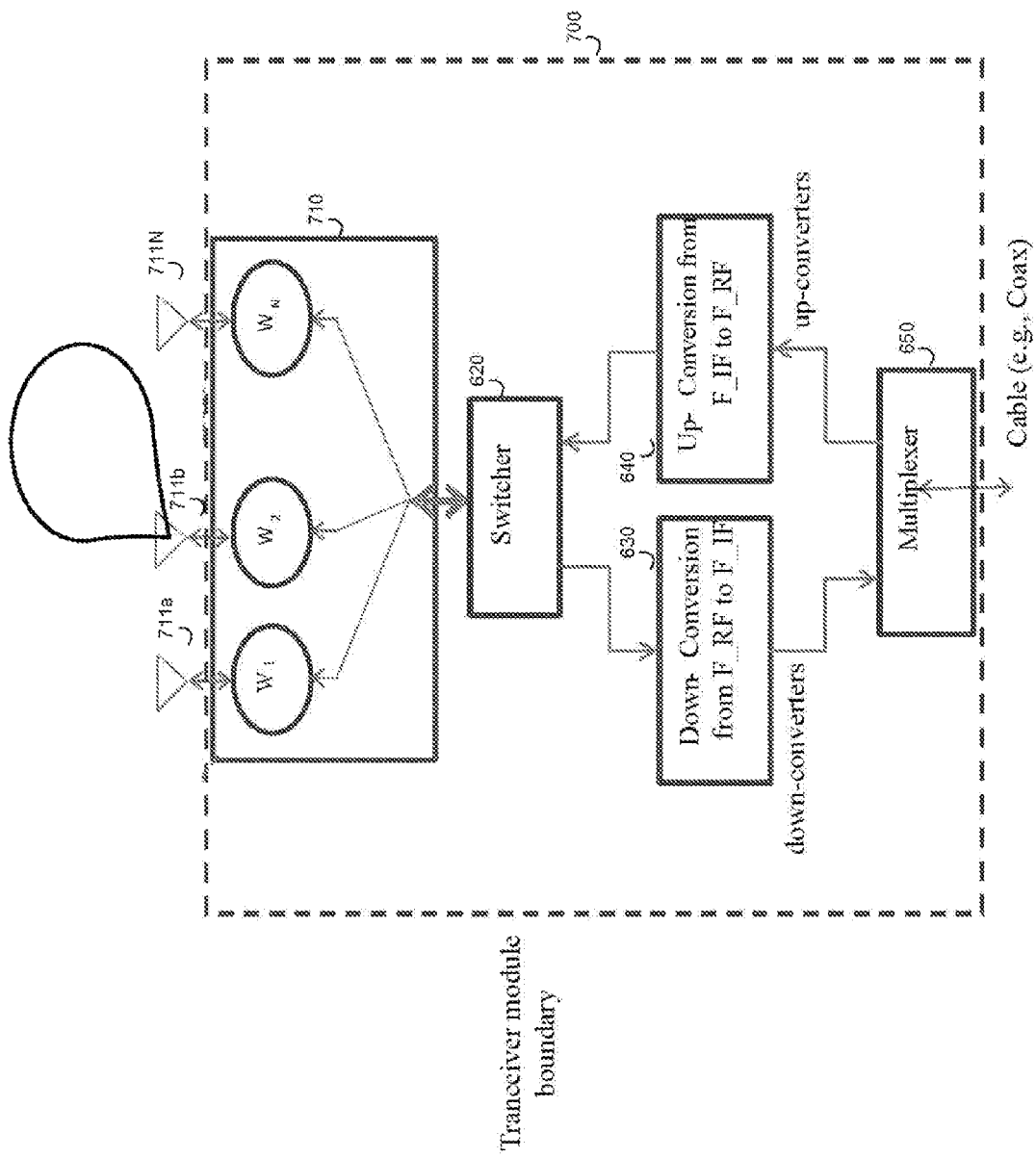
FIG. 7 is a diagram illustrating an exemplary transceiver module with a configurable phased antenna array, in accordance with an embodiment of the invention.

FIG. 7 is a diagram illustrating an exemplary transceiver module with a configurable phased antenna array, in accordance with an embodiment of the invention. As shown a transceiver 700 that comprises an antenna array 710, a switcher 620, down-converters 630, up-converters 640, and a multiplexer 650.

In an exemplary operation, the antenna array 710 may be a configurable phased antenna array. In this regard, the configurable phased antenna array 710 may have various orientations. Accordingly, the configurable phased antenna array 710 may be utilized to generate a steerable beam pattern to maximize coverage. In an exemplary embodiment of the invention, the switcher 620 may be configured to switch on only the transceivers that have strong propagation channel responses and are activated. Other transceivers may be switched off for power saving. For example, in some instances, the system identifies that transceiver 711a of the configurable phased antenna array 710 has the best LOS link to the receiver end (due to blocking objects in the room or nature of reflectors in the room). In this case, only the transceiver 711a may be switched on by the switcher 620 to transmit data to the receiver end and all other transceivers 711a through 711N of the configurable phased antenna array 710 are switched off for power saving. Beam patterns of the transceiver 711a may be selected or adjusted in various ways such as, for example, by beam pattern hopping, by correlating beam patterns or configurations with the location of the transceiver 711a, and/or by minimizing the power consumption. Beam pattern hopping is a method of beamforming by hopping beam patterns among a set of transmit/receive antennas.

Figure 8:
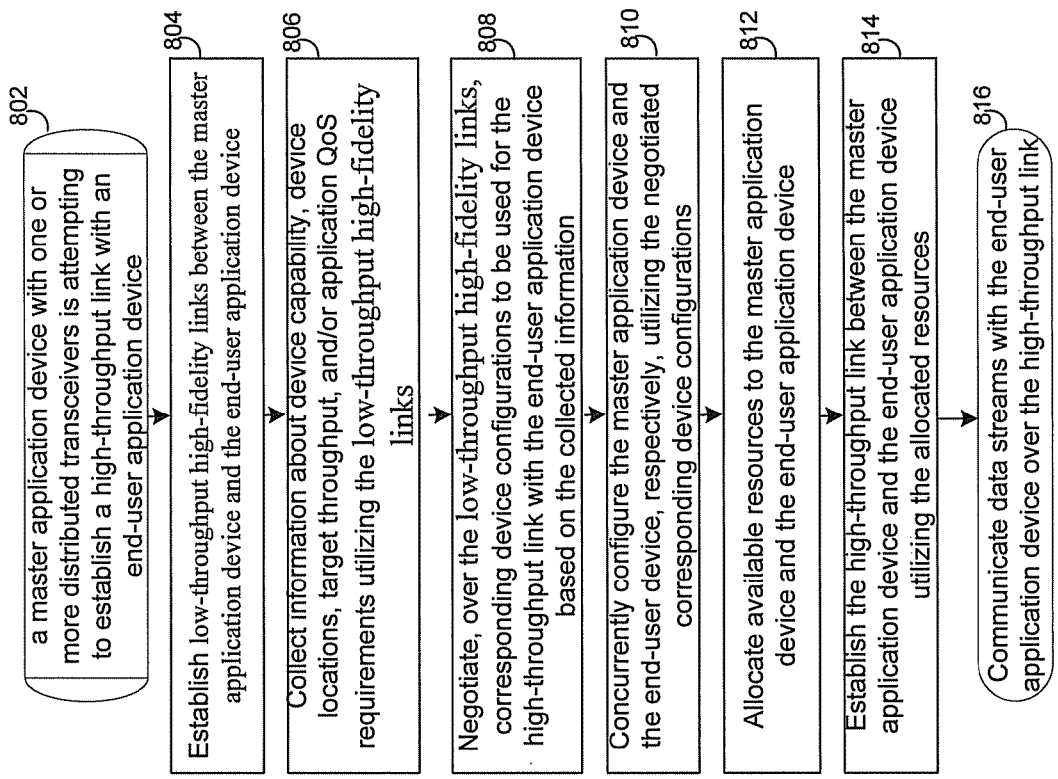
FIG. 8 is a diagram illustrating exemplary steps utilized by a master device with a collection of distributed transceivers to establish a high-throughput link with an end-user application device, in accordance with an embodiment of the invention.

FIG. 8 is a diagram illustrating exemplary steps utilized by a master device with a collection of distributed transceivers to establish a high-throughput link with an end-user application device, in accordance with an embodiment of the invention. Referring to FIG. 8, in step 802, the master application device 210 with one or more distributed transceivers 212a through 212e is attempting to establish a high-throughput link with an end-user application device such as the end-user application device 220. The exemplary steps start with step 804, where the master application device 210 may be operable to establish two low-throughput high-fidelity links 280b and 280a between the master application device 210 and the end-user application device 220. The low-throughput high-fidelity link 280b is an uplink connection from the end-user device 220 to the master application device 210. The low-throughput high-fidelity link 280a is a downlink connection from the master application device 210 to the end-user device 220.

In step 806, the network management engine 216 may be operable to track and collect information about device capability, device locations, target throughput, and/or application QoS requirements utilizing the low-throughput high-fidelity links from both the master application device 210 and the end-user application device 220. In step 808, the master application device 210 and the end-user application device may utilize the two low-throughput high-fidelity links 280b and 280a to negotiate corresponding device configurations to be used for the high-throughput link based on the collected information. In step 810, the network management engine 216 may concurrently configure the master application device 210 and the end-user application device 220 utilizing the negotiated corresponding device configurations. In step 812, the network management engine 216 may track the usage and availability of resources in the communication network 100. In step 814, the network management engine 216 may instruct or signal the master application device 210 and the end-user application device 220 to establish the high-throughput link utilizing the allocated resources. In step 816, the master application device 210 may communicate data streams with the end-user application device 220 over the high-throughput link.

Figure 9:
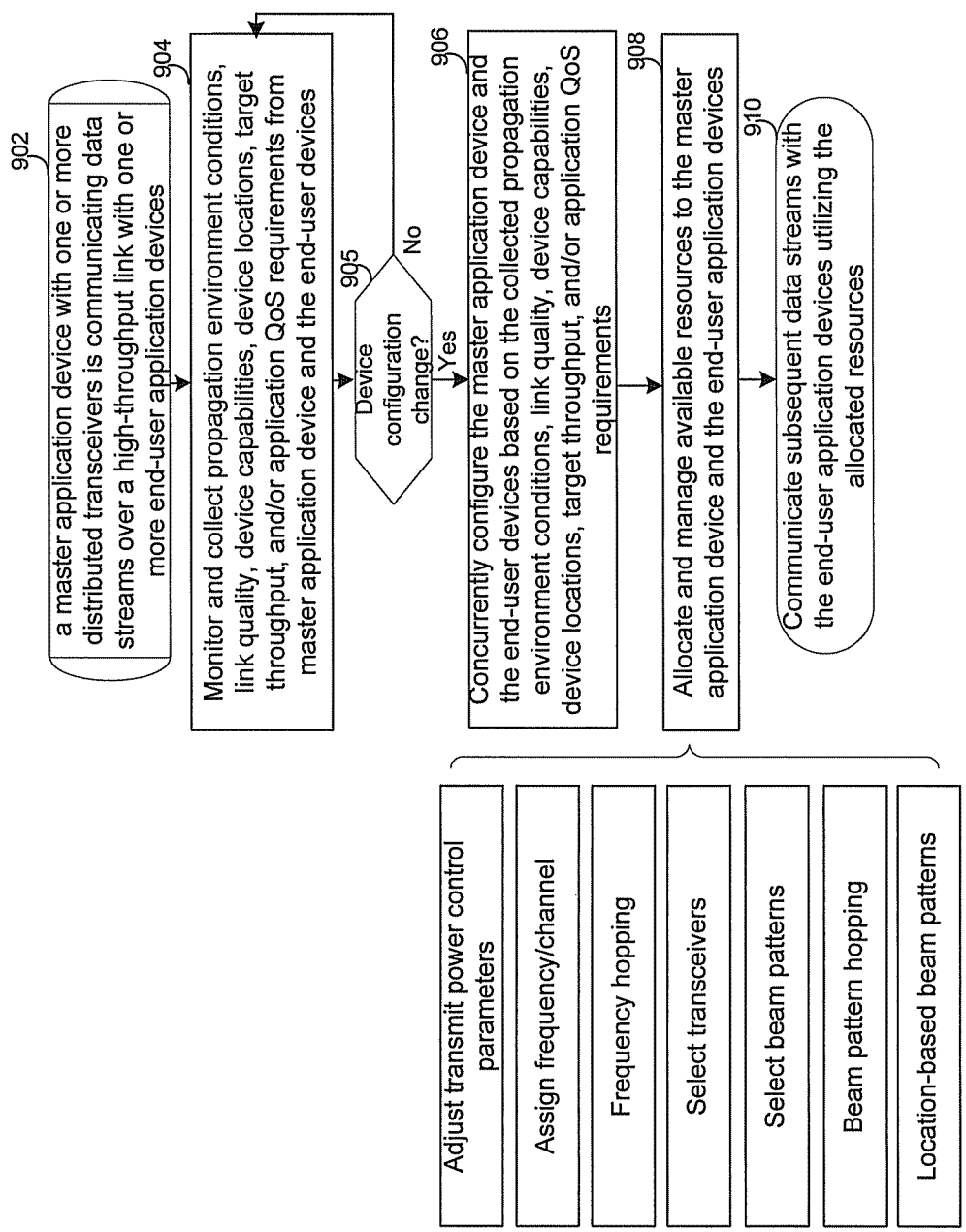
FIG. 9 is a diagram illustrating exemplary steps utilized by a master device for resource management during communication, in accordance with an embodiment of the invention.

FIG. 9 is a diagram illustrating exemplary steps utilized by a master device for resource management during communication, in accordance with an embodiment of the invention. Referring to FIG. 9, in step 902, the master application device 210 with one or more distributed transceivers 212a through 212e is communicating data streams over a high-throughput link with one or more end-user application devices such as the end-user application devices 220-230. The exemplary steps start with step 904, where the network management engine 216 in the master application device 210 may continuously monitor and collect propagation environment conditions, link quality, device capabilities, device locations, target throughput, and/or application QoS requirements from the master application device 210 and the end-user devices 220-230. In step 904, the network management engine 216 determines if a device configuration change is needed. For example, the network management engine 216 may evaluate the reported information such as link quality. In some instances, the reported link quality may be substantially way below acceptable levels. The network management engine 216 may determine that the master application device 210 and the end-user devices 220-230 need to be re-configured. The exemplary steps continue in step 906.

In step 906, the network management engine 216 may determine configurations for the master application device 210 and the end-user devices 220-230 based on the collected propagation environment conditions, link quality, device capabilities, device locations, target throughput, and/or application QoS requirements. The network management engine 216 may concurrently configure the master application device 210 and the end-user devices 220-230 based on the determined configurations. In step 908, the network management engine 216 may be operable to allocate and manage available resources to the master application device 210 and the end-user application devices 220-230. Various resource allocation and management mechanisms may be utilized by the network management engine 216. For example, for a given target throughput, the network management engine 216 may determine which transceivers in the master application device 210 and/or the end-user devices 220-230 should be switched ON or activated, and at what transmit levels. The network management engine 216 may adjust and manage transmit power levels of the activated transceivers.

In another example, the network management engine 216 may perform frequency and channel assignment, and beamforming without interfering with one another. In this regard, frequency hoping and beam pattern hopping may be utilized in frequency and channel assignment, and beamforming, respectively. In addition, the network management engine 216 may allocate resources and select beam patterns for the activated transceivers based on the physical locations of the activated transceivers. For example, narrow beams may be selected for devices in close proximity, and wide beams may be selected for devices that may be further away, respectively. For transmission, the network management engine 216 may set low transmit power for data transmission to close devices, and high transmit power for further devices, respectively. The exemplary process continues in step 910, where the master application device 210 may communicate subsequent data streams with the end-user devices 220-230 utilizing the allocated resources.

Aspects of a method and system for centralized resource management in a distributed transceiver network are provided. In accordance with various exemplary embodiments of the invention, as described with respect to FIG. 1 through FIG. 9, a device such as the master application device 210 comprises a plurality of distributed transceivers 212a-212e, the central baseband processor 214 and the network management engine 216. The plurality of distributed transceivers 212a-212e may be connected to the central baseband processor 214 and the network management engine 216 in the central processor 217 in a star topology or a ring topology as shown in FIGS. 4 and 5, respectively. The master application device 210 may be operable to communicate data streams that may comprise various multimedia information such as, for example, images, video, voice, as well as any other form of data utilizing one or more distributed transceivers selected from the plurality of the distributed transceivers 212a-212e to one or more other devices such as the end-user application devices 220-230. The network management engine 216 may concurrently configure the selected one or more distributed transceivers, for example, the distributed transceivers 212a-212c, and the end-user application devices 220-230 based on corresponding link quality and propagation environment during the data communication.

In an exemplary embodiment of the invention, the network management engine 216 may track the use and availability of resources such as, for example, frequency and channel, time slots, processors and storage in the communication network 100 during data communication. The network management engine 216 may allocate and manage resources through transmit power control, frequency hopping and/or beam pattern hopping to reduce outside electrical or RF interference during the data communication. The entire collection of the distributed transceivers 212a-212e may be communicatively coupled to the central processor 217 in a star topology or a ring topology. The central baseband processor 214 may be operable to perform digital signal processing needed for transmit and receive operations for the selected one or more distributed transceivers 212a-212c. During the data communication, the network management engine 216 may be operable to monitor or scan communication environment information such as, for example, propagation environment conditions, link quality, device capabilities, usage of resources, available resources, device locations, target throughput, and/or application QoS requirements. In an exemplary embodiment of the invention, the network management engine 216 may identify directions and antenna patterns that results in strong receive signals and/or a maximal coverage at the receiving devices such as the end-user application device 220 based on the corresponding propagation environment conditions and link quality.

The network management engine 216 may be operable to configure beamforming settings and/or antenna arrangement for the selected one or more distributed transceivers 212a-212c based on the identified directions and antenna patterns, device orientation, and/or receiver locations. For example, the network management engine 216 may select beam patterns for the selected distributed transceivers so as to minimize power consumption. In another example, the network management engine 216 may select beam patterns for the selected distributed transceivers based on the location and orientation information of the end-user application devices 220-230. In this regard, the network management engine 216 may identify the location and orientation information of the end-user application devices 220-230 through beaconing transmitted from the end-user application devices 220-230 utilizing Bluetooth and/or WLAN.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for centralized or distributed resource management in a distributed transceiver network.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of communication, the method comprising:
in a first device that comprises a plurality of distributed transceivers, each distributed transceiver of the first device comprising an antenna array comprising a plurality of antennas:
receiving information from a second device, the second device comprising a plurality of distributed transceivers, each distributed transceiver of the second device comprising an antenna array comprising a plurality of antennas, the information received from the second device comprising a number of transceivers of the second device;
based on the information received from the second device:
identifying a plurality of pairs of distributed transceivers, each pair of identified distributed transceivers comprising a corresponding transceiver from the plurality of transceivers of the first device and a corresponding transceiver from the plurality of transceivers of the second device;
for each identified pair of transceivers, identifying (i) a beam pattern for the antenna array of the corresponding distributed transceiver of the first device in the pair and (ii) a beam pattern for the antenna array of the corresponding distributed transceiver of the second device in the pair; and
concurrently configuring the antenna arrays of each pair of distributed transceivers in the plurality of identified pairs of distributed transceivers to communicate an independent data stream between the first and second devices, each said data stream communicated between a corresponding pair of distributed transceivers utilizing the identified beam pattern for the antenna arrays of the corresponding pair of distributed transceivers.

2. The method according to claim 1 further comprising allocating resources to the first and second devices to maintain the communication of said independent data streams communicated between the first and second devices.

3. The method according to claim 2, wherein said resource allocating comprises allocating frequency channels, time slots, and storage to the first and second devices.

4. The method according to claim 1, wherein the first device comprises a central baseband processor, the method further comprising performing digital signal processing by said central baseband processor for transmit and receive operations for each of said plurality of distributed transceivers of the first device during said communication.

5. The method according to claim 1 further comprising monitoring a set of conditions comprising a link quality and conditions of a propagation environment between the first and second devices during said communication,
wherein concurrently configuring the antenna arrays of each identified pair of distributed transceivers further comprises utilizing the monitored set of conditions.

6. The method according to claim 5 further comprising dynamically configuring said beam patterns of the antenna arrays for one or more of said pairs of distributed transceivers of the first and second devices based on said monitoring.

7. The method according to claim 5 further comprising controlling transmit power levels of each transceiver in said identified pairs of transceivers based on the monitored conditions.

8. The method according to claim 1, wherein identifying beam patterns of the antenna arrays of the plurality of distributed transceivers of the first device and the antenna arrays of the plurality of the distributed transceivers of the second device is further based on a number of transceivers of the first devices and a number of antennas of the antenna array of each transceiver of the first device.

9. The method according to claim 1, wherein the information received from the second device further comprises a number of antennas of the antenna array of each transceiver of the second device, wherein identifying beam patterns of the antenna arrays of the plurality of distributed transceivers of the first device and the antenna arrays of the plurality of the distributed transceivers of the second device is further based on the number of antennas of the antenna array of each transceiver of the second device.

10. The method according to claim 1, wherein the information received from the second device further comprises a location of the second device, wherein identifying beam patterns of the antenna arrays of the plurality of distributed transceivers of the first device and the antenna arrays of the plurality of the distributed transceivers of the second device is further based on the location of the second device.

11. The method according to claim 1, wherein the information received from the second device further comprises at least one of battery life, antenna polarization, radiation pattern, measured cross-interference levels, a sequence of antenna array coefficients being evaluated, target throughput, device capabilities, and application quality of service (QoS) requirements, wherein identifying beam patterns of the antenna arrays of the plurality of distributed transceivers of the first device and the antenna arrays of the plurality of the distributed transceivers of the second device is further based on said at least one of battery life, antenna polarization, radiation pattern, measured cross-interference levels, the sequence of antenna array coefficients being evaluated, target throughput, device capabilities, and application QoS requirements.

12. The method according to claim 1 further comprising establishing (i) an uplink control link with the second device to receive said information from the second device and (ii) a downlink control link to the second device to notify the second device of required configurations to communicate said plurality of independent data streams between the first and second devices.

13. The method according to claim 1 further comprising identifying polarization, spacing or array geometry of (i) the antenna arrays of the plurality of distributed transceivers of the first device and (ii) the antenna arrays of the plurality of the distributed transceivers of the second device based on the information received from the second device,
wherein concurrently configuring the antenna arrays of the plurality of distributed transceivers of the first device and the antenna arrays of the plurality of distributed transceivers of the second device further comprises utilizing the identified polarization, spacing or array geometry of the antenna arrays of the first and second devices.

14. The method according to claim 1, wherein the identified plurality of pairs of distributed transceivers comprise first and second pairs of distributed transceivers, the method further comprising:
identifying a plurality of reflectors in a propagation environment between the first and second devices;
wherein identifying the beam pattern for antenna arrays of the transceivers in the first pair comprises identifying a beam pattern for the antenna arrays of each distributed transceiver in the first pair for a direct line of sight (LOS) to communicate a data stream between the two transceivers, and
wherein identifying the beam pattern for antenna arrays of the transceivers in the second pair comprises identifying a beam pattern for the antenna arrays of each distributed transceiver in the second pair to point to a reflector in the plurality of the identified reflectors to communicate a data stream utilizing said reflector.

15. The method according to claim 1 further comprising concurrently configuring the antenna arrays of each identified pair of distributed transceivers such that a maximum pattern gain of the antenna array of each transceiver points to a particular direction to communicate a data stream between the antenna array of the corresponding distributed transceiver of the first device in the pair and the antenna array of the corresponding distributed transceiver of the second device in the pair.

16. A first device comprising:
a plurality of distributed transceivers, each distributed transceiver of the first device comprising an antenna array comprising a plurality of antennas, the first device configured to:
receive information from a second device, the second device comprising a plurality of distributed transceivers, each distributed transceiver of the second device comprising an antenna array comprising a plurality of antennas, the information received from the second device comprising a number of transceivers of the second device;
based on the information received from the second device:
identify a plurality of pairs of distributed transceivers, each pair of identified distributed transceivers comprising a corresponding transceiver from the plurality of transceivers of the first device and a corresponding transceiver from the plurality of transceivers of the second device;
for each identified pair of transceivers, identify (i) a beam pattern for the antenna array of the corresponding distributed transceiver of the first device in the pair and (ii) a beam pattern for the antenna array of the corresponding distributed transceiver of the second device in the pair; and
concurrently configure the antenna arrays of each pair of distributed transceivers in the plurality of identified pairs of distributed transceivers to communicate an independent data stream between the first and second devices, each said data stream communicated between a corresponding pair of distributed transceivers utilizing the identified beam pattern for the antenna arrays of the corresponding pair of distributed transceivers.

17. The device according to claim 16 further comprising a network management engine configured to allocate resources to the first and second devices to maintain the communication of said independent data streams between the first and second devices.

18. The device according to claim 17, wherein said resource allocating comprises allocating frequency channels, time slots, and storage to the first and second devices.

19. The device according to claim 16, further comprising a central baseband processor configured to perform digital signal processing for transmit and receive operations for each of said plurality of distributed transceivers of the first device during said communication.

20. The device according to claim 16 further comprising a network management engine configured to monitor a set of conditions comprising a link quality and conditions of a propagation environment between the first and second devices during said communication,
wherein concurrently configuring the antenna arrays of each identified pair of distributed transceivers further comprises utilizing the monitored set of conditions.

21. The device according to claim 20, wherein said network management engine is further configured to dynamically configure said beam patterns of the antenna arrays for one or more of said pairs of distributed transceivers of the first and second devices based on said monitoring.

22. The system device according to claim 20, wherein the network management engine further configured to control transmit power levels of each transceiver in said identified pairs of transceivers based on the monitored conditions.

23. The device according to claim 16, wherein identifying the beam pattern of the antenna arrays of each pair of distributed transceivers is further based on a number of transceivers of the first device and a number of antennas of the antenna array of each transceiver of the first device.

24. The device according to claim 16, wherein the information received from the second device further comprises a number of antennas of the antenna array of each transceiver of the second device, wherein identifying the beam pattern of the antenna arrays of each pair of distributed transceivers is further based on the number of antennas of the antenna array of each transceiver of the second device.

25. The device according to claim 16, wherein the information received from the second device further comprises a location of the second device, wherein identifying the beam pattern of the antenna arrays of each pair of distributed transceivers is further based on the location of the second device.

26. The device according to claim 16, wherein the information received from the second device further comprises at least one of battery life, antenna polarization, radiation pattern, measured cross-interference levels, a sequence of antenna array coefficients being evaluated, target throughput, device capabilities, and application quality of service (QoS) requirements, wherein identifying the beam pattern of the antenna arrays of each pair of distributed transceivers is further based on said at least one of battery life, antenna polarization, radiation pattern, measured cross-interference levels, the sequence of antenna array coefficients being evaluated, target throughput, device capabilities, and application QoS requirements.

27. The device according to claim 16, wherein the first device is further configured to establish (i) an uplink control link with the second device to receive said information from the second device and (ii) a downlink control link to the second device to notify the second device of required configurations to communicate said plurality of independent data streams between the first and second devices.

28. The device according to claim 16 further configured to identify one or more of polarization, spacing, and array geometry of (i) the antenna arrays of the plurality of distributed transceivers of the first device and (ii) the antenna arrays of the plurality of the distributed transceivers of the second device based on the information received from the second device,
wherein concurrently configuring the antenna arrays of each identified pair of distributed transceivers further comprises utilizing the determined polarization, spacing or array geometry of the antenna arrays of the first and second devices.

29. The device according to claim 16, wherein the identified plurality of pairs of distributed transceivers comprise first and second pairs of distributed transceivers, the device further configured to:
identify a plurality of reflectors in a propagation environment between the first and second devices;
wherein identifying the beam pattern for antenna arrays of the transceivers in the first pair comprises identifying a beam pattern for the antenna arrays of each distributed transceiver in the first pair for a direct line of sight (LOS) to communicate a data stream between the two transceivers, and wherein identifying the beam pattern for antenna arrays of the transceivers in the second pair comprises identifying a beam pattern for the antenna arrays of each distributed transceiver in the second pair to point to a reflector in the plurality of the identified reflectors to communicate a data stream utilizing said reflector.

30. The device according to claim 16, wherein the first device is further configured to concurrently configure the antenna arrays of each identified pair of distributed transceivers such that a maximum pattern gain of the antenna array of each transceiver points to a particular direction to communicate a data stream between the antenna array of the corresponding distributed transceiver of the first device in the pair and the antenna array of the corresponding distributed transceiver of the second device in the pair.

* * * * *